United States Patent

[11] 3,625,246

| [72] | Inventor | Henry V. Reaves<br>Cincinnati, Ohio |
|------|----------|-------------------------------------|
| [21] | Appl. No. | 859,698 |
| [22] | Filed | Sept. 22, 1969 |
| [45] | Patented | Dec. 7, 1971 |
| [73] | Assignee | Matrix Corporation<br>Houston, Tex. |

[54] NONBLEED HIGH-PRESSURE POSITIONER
20 Claims, 2 Drawing Figs.

[52] U.S. Cl................................................. 137/488,
137/625.66
[51] Int. Cl............................................... G05d 16/06
[50] Field of Search................................... 137/488,
625.66, 625.48, 625.63; 251/335.1

[56] References Cited
UNITED STATES PATENTS
737,681  9/1903  Waring........................ 137/488

| 2,082,940 | 6/1937 | Brisbane et al. .............. | 137/488 |
| 2,368,981 | 2/1945 | Griswold ...................... | 137/488 X |
| 2,645,237 | 7/1953 | Wheeler ...................... | 251/335 X |
| 3,205,909 | 9/1965 | Oldfield........................ | 137/488 X |
| 3,273,594 | 9/1966 | Mayer .......................... | 137/625.66 |
| 3,410,159 | 11/1968 | Zundel ........................ | 137/625.66 |

Primary Examiner—M. Cary Nelson
Assistant Examiner—R. B. Rothman
Attorney—J. Warren Kinney, Jr.

ABSTRACT: The positioner actuates a pipeline control valve, utilizing the full pressure of the pipeline for its operation, and is constructed to minimize bleeding and waste of the pipeline fluid in normal operation. Automatic operation depends entirely upon pressure differentials in the pipeline system.

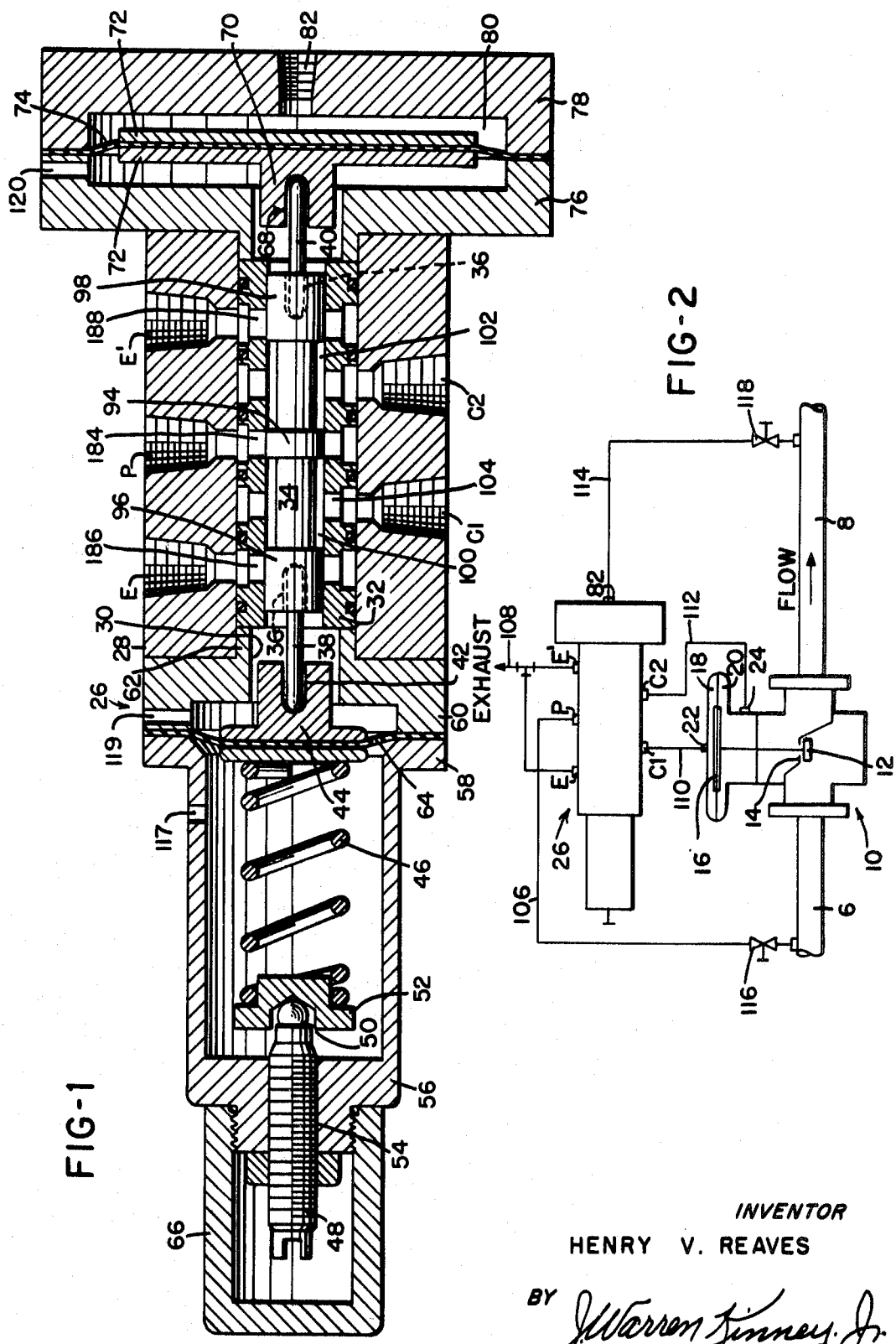

NONBLEED HIGH-PRESSURE POSITIONER

The present invention relates to a nonbleed high-pressure positioner. This type of device is useful in controlling flow or pressure of a fluid undergoing transmission by pipeline, for example, but may find application in other fields within the purview of the invention. In order to simplify and expedite the present disclosure, the nonbleed high-pressure positioner of the invention will be described as related to a typical application, namely, the automatic controlling of fluid pressure and flow through different sections of a gas transmission line or other pipeline. Other uses and applications will readily become manifest to persons skilled in resolving fluid flow and pressure control problems in various fields of endeavor.

The device of the invention may be employed to automatically regulate the passage of fluid through a control valve incorporated in a pipeline, by manipulating the valving member of the control valve between open and closed positions. It may comprise a valve body, lapped spool and sleeve assembly, and a diaphragm opposed by a biasing spring. Movement of the spool is controlled by a varying signal applied to the diaphragm. As the spool is shifted incident to variations in the signal strength, pneumatic (or hydraulic) means are placed in motion to drive the valving member of the pipeline control valve either toward a closing position or an opening position, depending upon the nature of the signal. Where the positioner is used in a pipeline whose pressure variations are slight, automatic actuation of the controlling valving member may also be slight for maintaining a desired or predetermined pressure or flow downstream of the pipeline valve. On the other hand, a sudden increase of pressure in either section of the pipeline may result in complete closure of the pipeline valve, until normal pipeline pressure is restored.

An object of the invention is to provide a valve positioner which is highly sensitive to pressure conditions in a pipeline, for actuating a pipeline control valve, said positioner being so constructed as to normally avoid wasteful and objectionable bleeding of fluid from the pipeline in the course of its operation.

Another object of the invention is to provide a simple, efficient and serviceable nonbleed positioner which utilizes the fluid pressure of the pipeline being controlled, in effecting actuation of the pipeline control valve.

Another object is to provide a valve positioner of the character stated, which minimizes air pollution and noise in the controlling of pipeline transmission systems, this being achieved inexpensively and with a minimum of maintenance and servicing costs.

A further object of the invention is to provide a device of the character stated, which is not unduly large in size and weight, and may be manufactured with substantial savings of labor and material.

The foregoing and other objects are attained by the means described herein and illustrated upon the accompanying drawing, in which:

FIG. 1 is a longitudinal cross section of a positioner embodying the teachings of the present invention.

FIG. 2 is a schematic plan of a pipeline and flow control valve, showing the manner of applying thereto the positioner of the present invention.

In the drawing, the numerals 6 and 8 indicate sections of a pipeline in which is interposed a control valve generally denoted 10. The pipeline may be used for the transmission of any fluid, gaseous or liquid, and will usually carry the fluid great distances at a very high pressure and rate of flow. In the case of natural gas transmission, for example, the pipeline may operate at pressures in excess of 2,000 p.s.i., to deliver the gas many hundreds of miles from its source.

At intermediate locations along the length of the pipeline, fluid may be shunted from the pipeline at greatly reduced pressure for use in cities, communities, consumer plants or the like, and it is generally desirable that the fluid so withdrawn be kept at a constant predetermined pressure and rate of flow. This may be accomplished at the control valve 10, by properly manipulating the valving member 12 to move it toward and from its seat 14 as variations of fluid pressure occur in one or both of the pipe sections 6 or 8.

In the illustration of FIG. 2, pipe section 6 may be considered a feeder upstream of valve 10 supplying fluid at very high pressure, while section 8 receives some or all of the fluid at a greatly reduced pressure downstream of valve 10.

In the example illustrated, the operating stem of valving member 12 is connected to the central portion of a flexible diaphragm 16 enclosed in a divided housing having an upper chamber 18 and a lower chamber 20, either of which chamber can be charged with fluid under pressure so as to move the valving member selectively toward or from its seat 14. Fluid may be supplied to chambers 18 and 20 through ports 22 and 24, respectively. Pipes or conduits feeding said ports are shown as single lines in the schematic illustration of FIG. 2. The valve positioner of the present invention is denoted 26.

The valve positioner may comprise a metallic elongate body 28 having a longitudinal cylindrical bore 30 in which is fixedly supported a sleeve 32. An elongate valving member or spool 34 is reciprocable within the sleeve 32, for movement to opposite limits of travel. The spool has sockets 36 formed in its opposite ends, to receive the loose pins 38 and 40. Pin 38 has a loose bearing in the socket 42 of a pressure block or plate 44, which latter may advance the pin 38 and spool 34 under the force of a spring 46. The force of spring 46 may be regulated by means of an adjustment screw 48, whose forward end 50 engages a spring seat member 52 supporting the rear end of spring 46.

The adjustment screw 48 may threadably engage the threaded bore 54 in a bonnet 56 which is fixed relative to valve body 28. The bonnet has an annular flange 58 secured to an adapter 60, which adapter carries a nipple 62 fitted into body bore 30 to locate and clamp in position the sleeve 32. The pressure block or plate 44 may be suspended between the parts 58 and 60 by a flexible diaphragm 64, so that the block or plate 44 is free to shift under the influence of spring 46. A protective cap 66 may normally cover the adjusting screw 48.

From the foregoing, it is apparent that spring 46 urges spool 34 in one direction, with a force dependent upon the position of adjusting screw 48.

The pin 40 which drives spool 34 in the opposite direction, has a loose seating engagement with the socket 68 of a diaphragm hub 70. Hub 70 is carried by the clamp plates 72 which embrace a flexible diaphragm 74. The peripheral margins of the diaphragm are clamped and sealed between a diaphragm head member 76 and a cover 78 therefor, said head member and cover being internally recessed to provide a chamber 80 in which the diaphragm may move. Chamber 80 communicates with a port 82 in cover 78, through which may be introduced a fluid under pressure for moving the diaphragm 74 in the direction of pressure block or plate 44. The members 76 and 78 constitute a sensing head, as will be explained.

It will be understood that pressure of fluid entering the diaphragm chamber through port 82, will tend to move the diaphragm 74, pin 40, and spool 34 in one direction counter to the force of spring 46. Should the pressure of fluid in chamber 80 be relaxed, spool 34 will be moved in the opposite direction by the force of spring 46.

The valve body is provided with ports P, E, E¹, C¹, and C², in addition to port 82. The spool 34 has three lands 94, 96, 98, spaced apart and separated by reduced-diameter sections 100 and 102 of the spool. Sleeve 32, which is stationary within the valve body, provides the necessary radial passageways exemplified by 104, for establishing fluid communication between the several body ports and the valve spool chambers at 100 and 102. In the normal or balanced condition of the spool, land 94 will substantially close off the port P, said port being an operating pressure intake port receiving pressure of fluid from the upstream section 6 of the pipeline, through a supply pipe 106, FIG. 2.

It may here be noted that land 94 controlling entry of fluid into the spool valve, has its width critically gauged to the width of the supply port or pressure port 184 of the sleeve, to a tolerance of about 0.001 inch. Accordingly, an exactly balanced or centered condition of the valve spool will position the land 94 for sealing off the intake port 184, with perhaps a slight amount of leakage. At the same time, the land 96 overlaps its exhaust port 186 by 0.005 to 0.0075 inch; and similarly, land 98 overlaps its exhaust port 188 the same amount, to insure sealing off the exhaust ports at the balanced valve condition. The exhaust ports E and E¹ are exposed to atmosphere, as by means of a stack indicated conventionally at 108 in FIG. 2, or otherwise as may be expedient.

The outlet ports C¹ and C² may be connected by means of suitable piping 110 and 112, to the chambers 18 and 20, respectively, of control valve 10, FIG. 2. Port 82 may be connected to the downstream section 8 of the pipeline by means of a pipe 114. The pipes 106 and 114 may include suitable shutoff valves 116 and 118, if desired.

In the situation exemplified by FIG. 2, pipe 114 conducts fluid under pressure, from the downstream section 8 of the pipeline to the chamber 80 of the sensing head 76—78, by way of port 82. The diaphragm 74 in chamber 80 will of course respond to the signal pressure in said chamber, to shift the valve spool 34 to the left in FIG. 1. Movement of the diaphragm is opposed by the adjustable biasing spring 46.

When a predetermined signal pressure is applied to diaphragm 74, a "null" position of the valve spool can be selected by adjusting the biasing spring tension to balance the pressure on the diaphragm. Now any variation in the signal pressure on the diaphragm 74, either increased or decreased from the preset signal pressure, will result in an axial shifting of the spool 34. Movement of the spool will result in one of the ports C¹ and C² being pressurized, and the other being exhausted. For example, in the event of a reduction of pressure in pipeline section 8 as the result of heavy demand, pressure in pipe 114 and chamber 80 will decrease, causing spring 46 to move spool 34 to the right. Consequently, spool land 94 will move to the right for admitting fluid from port P to outlet port C¹, whereupon pressured fluid will course through pipe 110 into the chamber 18 of control valve 10, for moving the valving member 12 farther from its seat 14.

While fluid pressure is thusly fed to control chamber 18, the other chamber 20 will be exhausting through pipe 112, port C², and port E¹, since land 98 will be at least partially displaced from port 188.

The aforesaid condition resulting in wider opening of control valve 12, will persist until the signal pressure in sensing chamber 80 is restored to the predetermined level dictated by the previously established force of spring 46. Once said predetermined level is restored, the spool will return to the "null" position, with the exhaust ports E, E¹ blocked and the pressure equalized in ports C¹, C². The restoring of signal pressure in the sensing chamber is of course accompanied by the restoring of pressure in pipeline section 8 to the desired or required level, which is a primary objective of the apparatus.

Under conditions the reverse of those cited above, wherein pressure in pipeline section 8 suffers an increase rather than a decrease, the diaphragm 74 will move spool 34 to the left, causing pressure of fluid to enter through port P and advance through outlet port C² and pipe 112, to charge the control valve chamber 20 for lifting diaphragm 16 and thereby moving the valving member 12 toward its seat. At the same time, chamber 18 will exhaust through pipe 110 and ports C¹ and E. This condition will persist until the signal pressure in chamber 80 is restored to the valve predetermined by the force of spring 46, this resulting in correcting the overpressure in pipeline section 8.

It may here be noted that operation of the apparatus disclosed is dependent upon pipeline pressure differentials. It is fully automatic, and the full line pressure of the pipe system can be utilized in its operation, this resulting in a simplified arrangement, with a minimum number of operating parts and a reduction in size of the apparatus. Moreover, the apparatus as disclosed effects substantial savings of the pressured fluid carried by the pipeline occurs while the spool of the positioner is in the normal "null" position.

The nonbleed character of the apparatus serves also to avoid to a great extent, pollution of the atmosphere in the vicinity of the control valve.

In fabricating the positioner, the spool and the sleeve should be very precisely ground and lapped, with precision observed in locating the ports of the sleeve and the lands of the spool. The lands are to have knife-sharp edges, and those lands which are located at the ends of the spool must overlap their respective sleeve ports by an amount ranging between 0.005 and 0.0075 inch. The width of the middle land 94 is to correspond to the width of its cooperative sleeve port 184, within a tolerance of 0.001 inch.

The positioner as herein disclosed, may be associated with all types of valves for the control of fluids under pressure, including plug valves, ball valves, gate valves and others having a controllable flow mechanism. The openings indicated at 117, 119 and 120, are vents to preclude undesirable buildup of pressure within those chambers of the valve structure which may best perform under atmospheric pressure conditions.

What is claimed is:

1. In a device for positioning the valving member of a valve in control of pipeline fluid under pressure, comprising: an elongate valve body having a longitudinal bore, an operating pressure intake port, two exhaust ports, and two outlet ports, all of said ports being in fluid communicating relationship with said bore; an elongate spool reciprocable in the body bore, said spool having opposite ends, a land near each end, and an intermediate land separated from the end lands by passageways therebetween adapted to convey a fluid; sand spool being longitudinally shiftable in opposite directions from a centered position at which the intermediate land blocks the operating pressure intake port while at the same time the end lands block the two exhaust ports and each outlet port stands in fluid communicating relationship to one of the spool passageways; yielding means tending constantly to shift the spool from the centered position toward an operative position at which the intermediate land of the spool uncovers the operating pressure intake port for feeding pressured fluid into one of said outlets ports through one of said spool passageways, the other of said spool passageways being thereby placed in fluid communication with one of said exhaust ports incident to shifting of one end land to uncover said one exhaust port; a variable pressure sensing head associated with the valve body, said head including a pressure chamber to communicate with a source of variable pressure; and means operable by variations of a fluid signal pressure fed to said chamber, for shifting said spool toward and beyond the centered position aforesaid, in opposition to the force of said yielding means, for effecting pressurization of the other outlet port and exhausting of said one outlet port through the remaining exhaust port uncovered by the other end land and flexible self-aligning means for transmitting to said spool the movements imposed by said yielding means and the shifting means last mentioned.

2. The device as defined by claim 1, wherein said yielding means is selectively adjustable as to the force imposed thereby upon the spool.

3. The device as defined by claim 1, wherein the means last mentioned comprises a flexible diaphragm in said chamber exposed to the fluid signal pressure variations aforesaid.

4. The device as defined by claim 3, wherein combination includes a second diaphragm cooperating with the flexible diaphragm first mentioned, to substantially envelop the shiftable spool.

5. The device as defined by claim 4, wherein said yielding means is selectively adjustable as to the force imposed thereby upon the shiftable spool.

6. The device as defined by claim 5, wherein the combination includes flexible self-aligning means for transmitting to said spool the movements imposed by said yielding means and the spoolshifting means of the signal pressure operated means.

7. The device as defined by claim 3, wherein said exposed area of the flexible diaphragm is of substantially greater size than the end area of the spool.

8. The device as defined by claim 1, wherein the intermediate land of the spool covers the operating pressure inlet port with an overlap not exceeding about 0.001 inch, and the overlap of each end land with its adjacent exhaust port ranges between 0.005 and 0.0075 inch.

9. In combination with an upstream section and a downstream section of a pressured fluid transmission pipeline; a control valve interposed between said pipeline sections, said control valve including a seat, and a valving member adjustable relative to said seat for varying the flow of fluid from the upstream section to the downstream section of the pipeline; and pressure-operated means controlled by variations in pressure of fluid in the downstream section of the pipeline, for adjusting the position of the valving member relative to said seat, said pressure operated means including a control valve actuator means having an elongate valve body having a longitudinal bore, an operating pressure intake port, two exhaust ports, and two outlet ports, all of said ports being in fluid communicating relationship with said bore; an elongate spool reciprocable in the body bore, said spool having opposite ends, a land near each end, and an intermediate land separated from the end lands by passageways therebetween adapted to convey a fluid; said spool being longitudinally shiftable in opposite directions from a centered position at which the intermediate land blocks the operating pressure intake port while at the same time the end lands block the two exhaust ports and each outlet port stands in fluid communicating relationship to one of the spool passageways; yielding means tending constantly to shift the spool from the centered position toward an operative position at which the intermediate land of the spool uncovers the operating pressure intake port for feeding pressured fluid into one of said outlet ports through one of said spool passageways, the other of said spool passageways being thereby placed in fluid communication with one of said exhaust ports incident to shifting of one end land to uncover said one exhaust port; a variable-pressure sensing head associated with the valve body, said head including a pressure chamber to communicate with a source of variable pressure; and means operable by variations of a fluid signal pressure fed to said chamber, for shifting said spool toward and beyond the centered position aforesaid, in opposition to the force of said yielding means, for effecting pressurization of the other outlet port and exhausting of said one outlet port through the remaining exhaust port uncovered by the other end land and flexible self-aligning means for transmitting to said spool the movements imposed by said yielding means and the shifting means last mentioned.

10. The combination as defined by claim 9, wherein said control valve actuator means is powered by pressure of fluid shunted from said upstream section of the pipeline.

11. The combination as defined by claim 10, wherein said actuator means includes means for substantially blocking off the flow of shunted fluid as long as the pressure of fluid in the downstream section of the pipelines remains at a predetermined value.

12. The combination as defined by claim 9, wherein said control valve actuator means is powered by pressure of fluid shunted from one of said pipeline sections.

13. The combination as defined by claim 9, wherein said pressure-operated means includes a nonbleed valving member positioner.

14. The combination as defined by claim 9, wherein said yielding means is selectively adjustable as to the force imposed thereby upon the spool.

15. The combination as defined by claim 9, wherein the means last mentioned comprises a flexible diaphragm in said chamber exposed to the fluid signal pressure variations aforesaid.

16. The combination as defined by claim 15, wherein there is included a second diaphragm cooperating with the flexible diaphragm first mentioned, to substantially envelop the shiftable spool.

17. The combination as defined by claim 16, wherein said yielding means is selectively adjustable as to the force imposed thereby upon the shiftable spool.

18. The combination as defined in claim 17, wherein there is included a flexible self-aligning means for transmitting to said spool the movements imposed by said yielding means and the spool shifting means of the signal pressure operated means.

19. The combination as defined by claim 15, wherein said exposed area of the flexible diaphragm is of substantially greater size than the end area of the spool.

20. The combination as defined by claim 9, wherein the intermediate land of the spool covers the operating pressure inlet port with an overlap not exceeding about 0.001 inch, and the overlap of each end land with its adjacent exhaust port ranges between 0.005 and 0.0075 inch.

* * * * *